United States Patent
Allen et al.

(10) Patent No.: US 9,026,514 B2
(45) Date of Patent: May 5, 2015

(54) METHOD, APPARATUS AND ARTICLE FOR ASSIGNING A SIMILARITY MEASURE TO NAMES

(75) Inventors: Thomas Bradley Allen, Henderson, NV (US); Michael Henry D'Amico, Las Vegas, NV (US); Dominique Jeremy Evans, North York (CA); Brand Lee Hunt, Las Vegas, NV (US); Brian Eugene Macy, Henderson, NV (US)

(73) Assignee: International Business Machines Corporation, Armonk, NY (US)

( * ) Notice: Subject to any disclaimer, the term of this patent is extended or adjusted under 35 U.S.C. 154(b) by 2669 days.

(21) Appl. No.: 11/549,374

(22) Filed: Oct. 13, 2006

(65) Prior Publication Data

US 2008/0091674 A1    Apr. 17, 2008

(51) Int. Cl.
*G06F 17/30*    (2006.01)
*G06F 17/27*    (2006.01)

(52) U.S. Cl.
CPC .................................. *G06F 17/278* (2013.01)

(58) Field of Classification Search
USPC .................................................. 707/706, 758
See application file for complete search history.

(56) References Cited

U.S. PATENT DOCUMENTS

| | | | |
|---|---|---|---|
| 5,815,830 A * | 9/1998 | Anthony ........................ | 707/758 |
| 5,926,812 A | 7/1999 | Hilsenrath et al. | |
| 6,047,300 A | 4/2000 | Walfish et al. | |
| 6,178,396 B1 | 1/2001 | Ushioda | |
| 6,616,704 B1 | 9/2003 | Birman et al. | |
| 6,708,166 B1 * | 3/2004 | Dysart et al. ................... | 707/765 |
| 6,735,604 B2 * | 5/2004 | Miller et al. ................... | 707/600 |
| 6,912,536 B1 * | 6/2005 | Ochitani ........................ | 707/737 |
| 6,934,704 B2 * | 8/2005 | Okada et al. ................... | 707/758 |
| 6,963,871 B1 * | 11/2005 | Hermansen et al. ................... | 1/1 |
| 6,970,883 B2 * | 11/2005 | Ku et al. ......................... | 707/752 |
| 7,028,019 B2 * | 4/2006 | McMillan et al. ............. | 707/691 |
| 7,111,015 B2 * | 9/2006 | Aoyama ........................ | 707/758 |
| 2003/0135826 A1 | 7/2003 | Dozier | |
| 2003/0182101 A1 | 9/2003 | Lambert | |
| 2004/0024760 A1 | 2/2004 | Toner et al. | |
| 2004/0117385 A1 | 6/2004 | Diorio et al. | |
| 2005/0065776 A1 | 3/2005 | Coden et al. | |
| 2005/0084152 A1 * | 4/2005 | McPeake et al. ............. | 382/173 |
| 2005/0119875 A1 | 6/2005 | Shaefer, Jr. et al. | |
| 2005/0182783 A1 | 8/2005 | Vadai et al. | |
| 2006/0031239 A1 | 2/2006 | Koenig | |

OTHER PUBLICATIONS

W.E.Yancey, "Evaluating String Comparator Performance for Record Linkage," Technical Report Statistical Research Report Series RRS 2000 Bureau of the Census, Washington, D.C., Jun. 2005.*

* cited by examiner

*Primary Examiner* — Kim Nguyen
(74) *Attorney, Agent, or Firm* — Patterson & Sheridan, LLP

(57) ABSTRACT

A method, article and apparatus for calculating a measure of similarity between names is disclosed. Generally, name elements from an inbound name may be matched to name elements in a candidate matching name. A measure of similarity for the inbound name and candidate matching name may be calculated based on the number of matching name elements, an inbound name word count, a candidate name word count, and the number of transpositions that occur in matching name elements with one another.

21 Claims, 6 Drawing Sheets

| INBOUND POS# | MATCH POSITION# | SCORE | KEEP/DISCARD (Y/N) |
|---|---|---|---|
| 1 (ALLEN) | 2 (ALLEN) | 1.00 | Y |
| 2 (BENNETT) | 3 (BENET) | .905 | Y |
| 5 (JONES) | 1 (JOHN) | .783 | Y |
| 3 (JOSE) | 1 (JOHN) | .667 | N |
| 5 (JONES) | 3 (BENET) | .6 | N |
| 1 (ALLEN) | 1 (JOHN) | .483 | N |
| 3 (JOSE) | 3 (BENET) | .483 | N |
| 1 (ALLEN) | 3 (BENET) | .467 | N |
| 4 (ABDUL) | 3 (BENET) | .467 | N |
| 2 (BENNETT) | 1 (JOHN) | .464 | N |
| 4 (ABDUL) | 1 (JOHN) | 0 | N |

FIG. 5A

| INBOUND POS# | MATCH POS# |
|---|---|
| 1 (ALLEN) | 2 (ALLEN) |
| 2 (BENNETT) | 3 (BENET) |
| 5 (JONES) | 1 (JOHN) |

515, 455, 460

517 — WORDS IN COMMON: 3
INBOUND NAME WORD COUNT: 5
CANDIDATE MATCHING NAME WORD COUNT: 3
TRANSPOSITIONS: 1

FIG. 5C $$x(c/I) + y\frac{c}{b} + z\left(\frac{(c-t)}{c}\right)$$

510

519 — $1/3\,(3/5) + 1/3\,(3/3) + 1/3\left(\frac{3-1}{3}\right) =$
$1/5 + 1/3 + 2/9 = .7555$ — 523

INITIAL MEASURE OF SIMILARITY
SIMILARITY CALCULATION

521 — FINAL SIMILARITY SCORE:

$.7555 * 1 * .905 * .783 = .535$

525

$$500 \begin{cases} \left(\begin{array}{c}\text{WEIGHTING}\\\text{COEFFICIENT \#1}\\(x)\end{array}\right)\left(\dfrac{\text{WORDS IN COMMON (c)}}{\text{INBOUND WORD COUNT (i)}}\right) + \left(\begin{array}{c}\text{WEIGHTING}\\\text{COEFFICIENT \#2}\\(y)\end{array}\right) + \left(\dfrac{\text{WORDS IN COMMON (c)}}{\text{CANDIDATE WORD COUNT (b)}}\right) + \\[2em] \left(\begin{array}{c}\text{WEIGHTING}\\\text{COEFFICIENT \#3}\\(z)\end{array}\right) + \left(\dfrac{(\text{WORDS IN COMMON}) - (\text{TRANSPOSITIONS}(t))}{\text{WORDS IN COMMON}}\right) \end{cases}$$

502, 504, 506

$$x\left(c/i\right) + y\left(\dfrac{c}{b}\right) + z\left(\dfrac{(c-t)}{c}\right)$$

METHOD, APPARATUS AND ARTICLE FOR ASSIGNING A SIMILARITY MEASURE TO NAMES

BACKGROUND OF THE INVENTION

1. Field of the Invention

Embodiments of the invention related to data processing. More specifically, embodiments of the invention are related to calculating a measure of similarity for two names, each represented by character strings.

2. Description of the Related Art

In comparing character strings, algorithms are available that measure how "close" two strings are to one another. Typically, such algorithms measure "closeness" based on the number of individually matching characters and on the positional proximity of matching characters. One commonly used algorithm for comparing character strings is the public-domain Jaro-Winkler algorithm for string correlation. The Jaro-Winkler algorithm assigns a score that accounts for the following: length of both strings, percentage of common characters in each string, missing characters, mismatched characters, and letters that have been swapped with one another.

However, when applied to name comparisons, simple string correlation techniques, such as Jaro-Winkler have proven to be inadequate. To properly compare names one needs to not only ensure that the individual words or name elements are similar, but how the entire name is assembled is also important. For example, the name Thomas Joe Allen could easily be altered to be Joseph Alan Thomas and none of the words would match in position. The difference in two names being compared may result from how people write their names in formal versus informal situations, such as "James vs Jimmy" or even from unintentional errors. For example, when filling out a form, someone may write their name as "James, Robert." If this is incorrectly entered as "James Roberts," then a simple string comparison fail to match these names. Sometimes individuals may write different permutations of their names in an attempt to hide one's identity. Consider hotel registrations at casino resorts. Sometimes, individuals may be banned from a particular casino. In such a case, the banned individual may attempt to register at the hotel using a false, but similar name to their actual one. In each of these examples, applying conventional string correlation algorithms fails to identify that two names are very similar to one another.

Accordingly, there is a need in the art for a method for assigning a similarity measure to names.

SUMMARY OF THE INVENTION

Embodiments of the invention include a method of determining a measure of similarity between an inbound name and a candidate matching name. The method generally includes identifying one or more matches between name elements of the inbound name and name elements of the candidate matching name. Each match may be identified based on a correlation measure between the matched name element of the inbound name and the matched name element of the candidate matching name. For the identified matches, the method includes determining a number of transpositions in an order of name elements of the inbound name elements relative to the name elements of the candidate matching name. The method also includes calculating a measure of similarity based on the number of matching name elements, an inbound name word count, a candidate matching name word count, and the number of transpositions.

In a particular embodiment, the correlation measure between the matched name element of the inbound name and the matched name element of the candidate matching name is determined using the Jaro-Winkler measure of string correlation. Additionally, the measure of similarity may be calculated according to the formula of:

$$(\tfrac{1}{3})*(\text{Number of matching name elements/inbound name word count})+(\tfrac{1}{3})*(\text{Number of matching name elements/candidate matching name word count})+(\tfrac{1}{3})*((\text{Number of matching name elements}-\text{Number of transpositions})/(\text{Number of matching name elements})).$$

Embodiments of the invention also include computer readable storage media used to store a program which, when executed, performs an operation for determining a measure of similarity between an inbound name and a candidate matching name. The operations of the program include identifying one or more matches between name elements of the inbound name and name elements of the candidate matching name. Each match may be identified based on a correlation measure between the matched name element of the inbound name and the matched name element of the candidate matching name. For the identified matches, the operations include determining a number of transpositions in an order of name elements of the inbound name elements relative to the name elements of the candidate matching name. The operations also include calculating a measure of similarity based on the number of matching name elements, an inbound name word count, a candidate matching name word count, and the number of transpositions.

Embodiments of the invention also include a system having a processor and a memory containing a program configured to determine a measure of similarity between an inbound name and a candidate matching name. The program may be generally configured to identify one or more matches between name elements of the inbound name and name elements of the candidate matching name. Each match may be identified based on a correlation measure between the matched name element of the inbound name and the matched name element of the candidate matching name. For the identified matches, the program may be configured to determine a number of transpositions in an order of name elements of the inbound name elements relative to the name elements of the candidate matching name. The program may be further configured to calculate a measure of similarity based on the number of matching name elements, an inbound name word count, a candidate matching name word count, and the number of transpositions.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5A illustrates a table of matching name elements and offset data calculated for the example inbound name and candidate matching name of FIG. 4A, according to one embodiment of the invention.

FIG. 5B illustrates an equation for measuring the similarity between an inbound name and candidate matching name, according to one embodiment of the invention.

FIG. 5C illustrates the similarity equation shown in FIG. 5B used to calculate a measure of similarity for the example inbound name and candidate matching name, according to one embodiment of the invention.

DETAILED DESCRIPTION OF THE PREFERRED EMBODIMENTS

Figure 1:
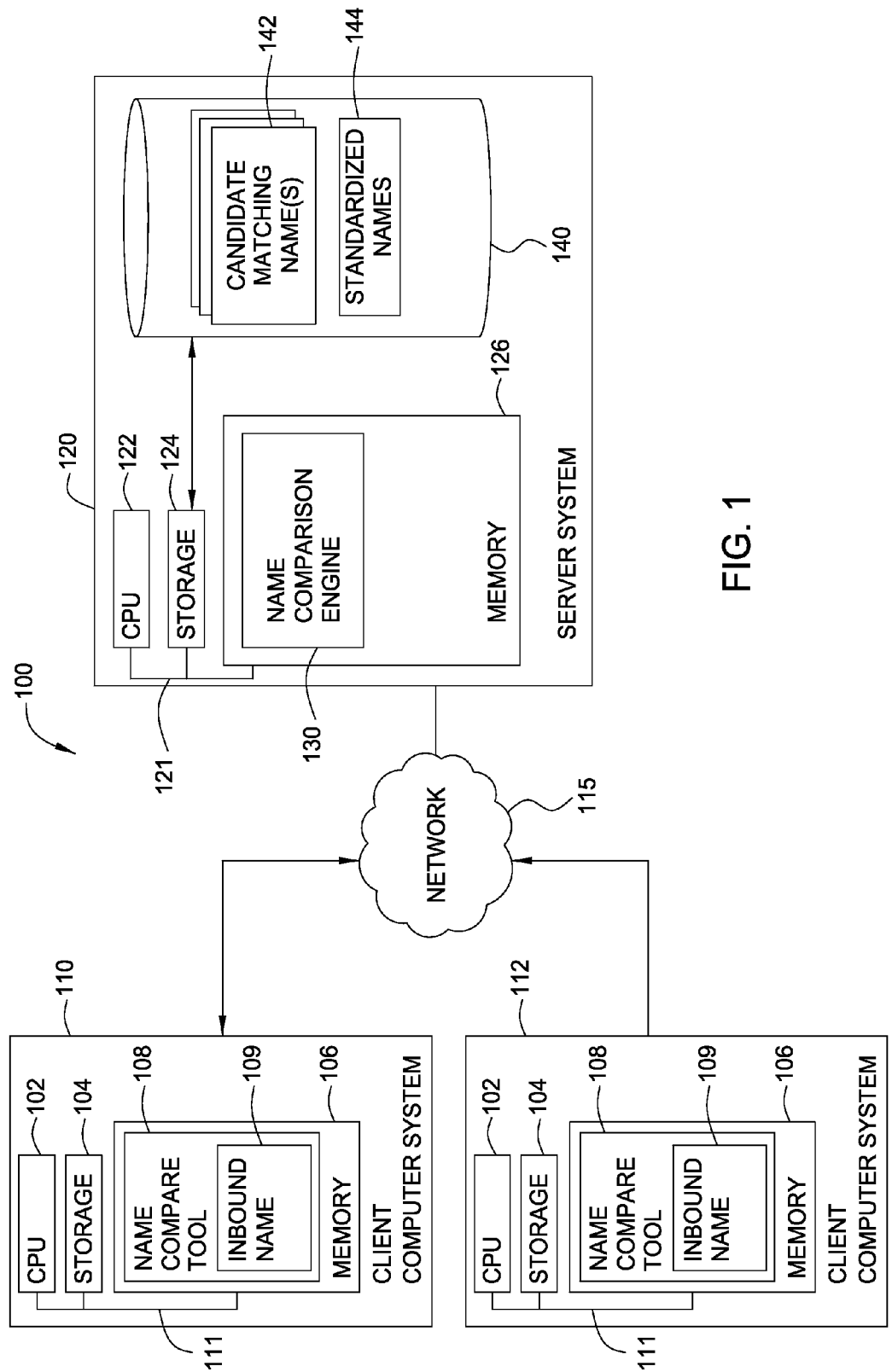
FIG. 1 is a block diagram illustrating a computing environment, according to one embodiment of the invention.

Embodiments of the invention provide a method, system and article of manufacture for measuring the similarity between two names.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM or DVD-ROM disks readable by a CD- or DVD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a computing environment 100, according to one embodiment of the invention. As shown, computing environment 100 includes two client computer systems 110 and 112 communicating with a server system 120 over a network 115. The computer systems 110, 112, and server system 120 illustrated in computing environment 100 are included to be representative of existing computer systems, e.g., desktop computers, server computers, laptop computers, tablet computers and the like. However, embodiments of the invention are not limited to any particular computing system, application, device, or architecture, and instead, may be adapted to take advantage of new computing systems and platforms as they become available. Additionally, those skilled in the art will recognize that the illustration of computer systems 110, 112, and server system 120 are simplified to highlight aspects of the present invention and that computing systems and networks typically include a variety of additional elements not shown in FIG. 1.

As shown, client computer systems 110 and 112 each include a CPU 102, storage 104, and memory 106 connected by a bus 111. CPU 102 is a programmable logic device that performs all the instructions, logic and mathematical processing performed in executing user applications (e.g., a name compare tool 108). Storage 104 stores application programs and data for use by client computer systems 110 and 112. Typical storage devices 104 include hard-disk drives, flash memory devices, optical media and the like. Additionally, the processing activity of name compare tool 108 may be coordinated by an operating system (not shown). Well known examples of operating systems include the I5/OS® operating system available from IBM and distributions of the Linux® operating system, among others. (Linux is a trademark of Linus Torvalds in the United States, other countries, or both). Network 115 represents any kind of data communications network, including both wired and wireless networks. Accordingly, network 115 is representative of both local and wide area networks, including the Internet. Illustratively, memory 106 of client computer systems 110 and 112 includes name compare tool 108. In one embodiment, name compare tool 108 allows a user to specify an inbound name 109 to be compared with one or more candidate matching name 142.

As shown, server system 120 also includes a CPU 122, storage 124, and memory 126, connected by a bus 121. Storage 124 may store a database 140 that includes one or more candidate matching names 142 to be compared with the inbound name 109 submitted by a user. Database 140 may also include a dictionary of standardized names 144. In one embodiment, name elements of inbound name 109 and/or candidate matching name 142 may be standardized using a dictionary of standardized names 144. For example, the names "John," "Johnny," and "Jonathan" may all be standardized to a common form. In such a case, a similarity score may be determined for inbound name 109 and candidate matching name 142 as submitted, as well has after having been transformed into a standardized form.

Illustratively, memory 126 includes a name comparison engine 130. In one embodiment, the name comparison engine 130 includes software routine configured to perform the data processing routines described herein to assign a measure of similarity between inbound name 109 and candidate matching name 142.

Although computing environment 100 of FIG. 1 provides an example of a client/server architecture, one of ordinary skill in the art will recognize that embodiments of the invention may be adapted for use in a variety of computing environments, such as standalone systems, distributed systems embedded systems and the like. For example, the name comparison engine 130 and name compare tool 108 may be part of a software application running on a single computer system.

Figure 2:
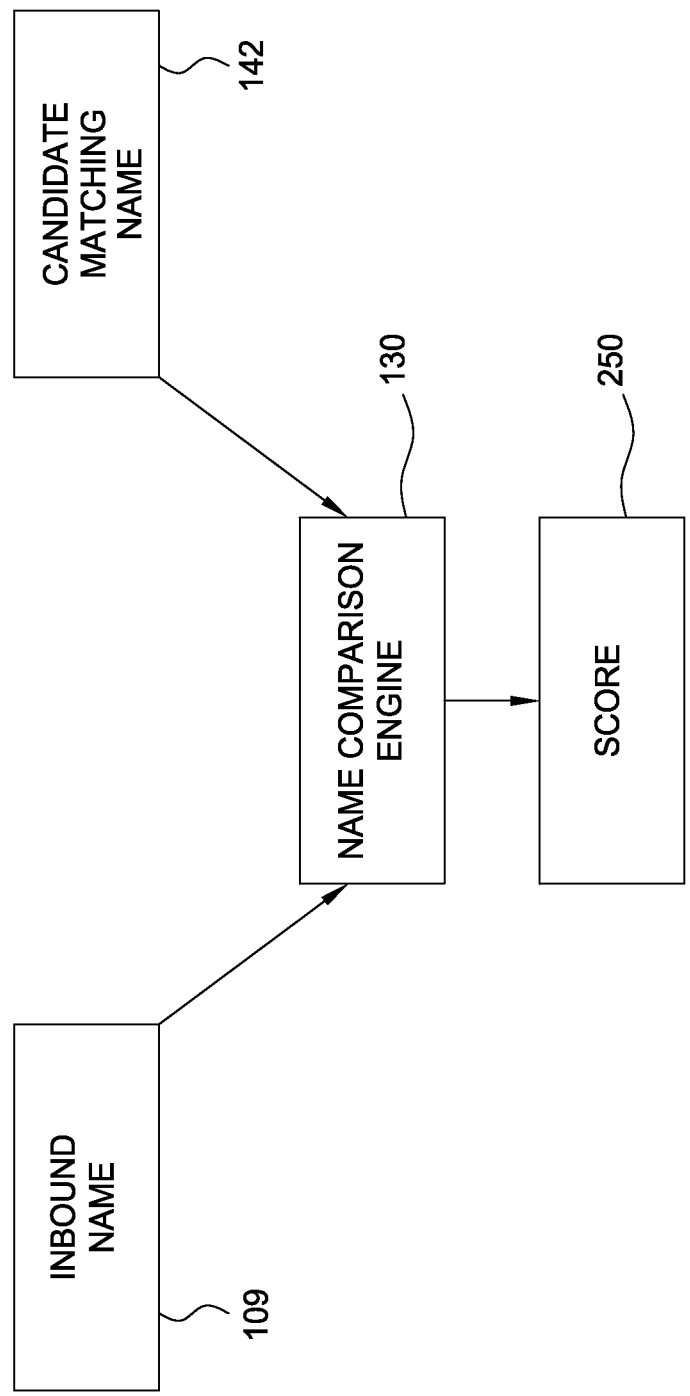
FIG. 2 is a conceptual illustration of the operations of a name comparison engine configured to measure the similarity between an inbound name and a candidate matching name, according to one embodiment of the invention.

FIG. 2 is a conceptual illustration of the operations of a name comparison engine 130, according to one embodiment of the invention. As shown, the name comparison engine 130 is configured to measure the similarity between inbound name 109 and candidate matching name 142. The name comparison tool 130 takes as input inbound name 109 and candidate matching name 142. Once received, the comparison engine 130 assigns a score 250 representing a measure of similarity between the inbound name 109 and candidate matching name 142. Typically, the score 250 is represented as a real number value ranging from 0 to 1, where 1 represents an exact match between inbound name 109 and candidate matching name 142, based on both matching name elements and an ordering of the name elements. The greater the value of the score 250, the more similar the inbound name 109 and candidate matching name 142 are to one another. As described in greater detail herein, assigning a measure of similarity for two names may account for a variety of factors including, for example, the number of name elements in inbound name 109 and candidate matching name 142, how many individual name elements match, the ordering of the matches that occur, and whether initials or name standardization was used in the comparison.

Figure 3:
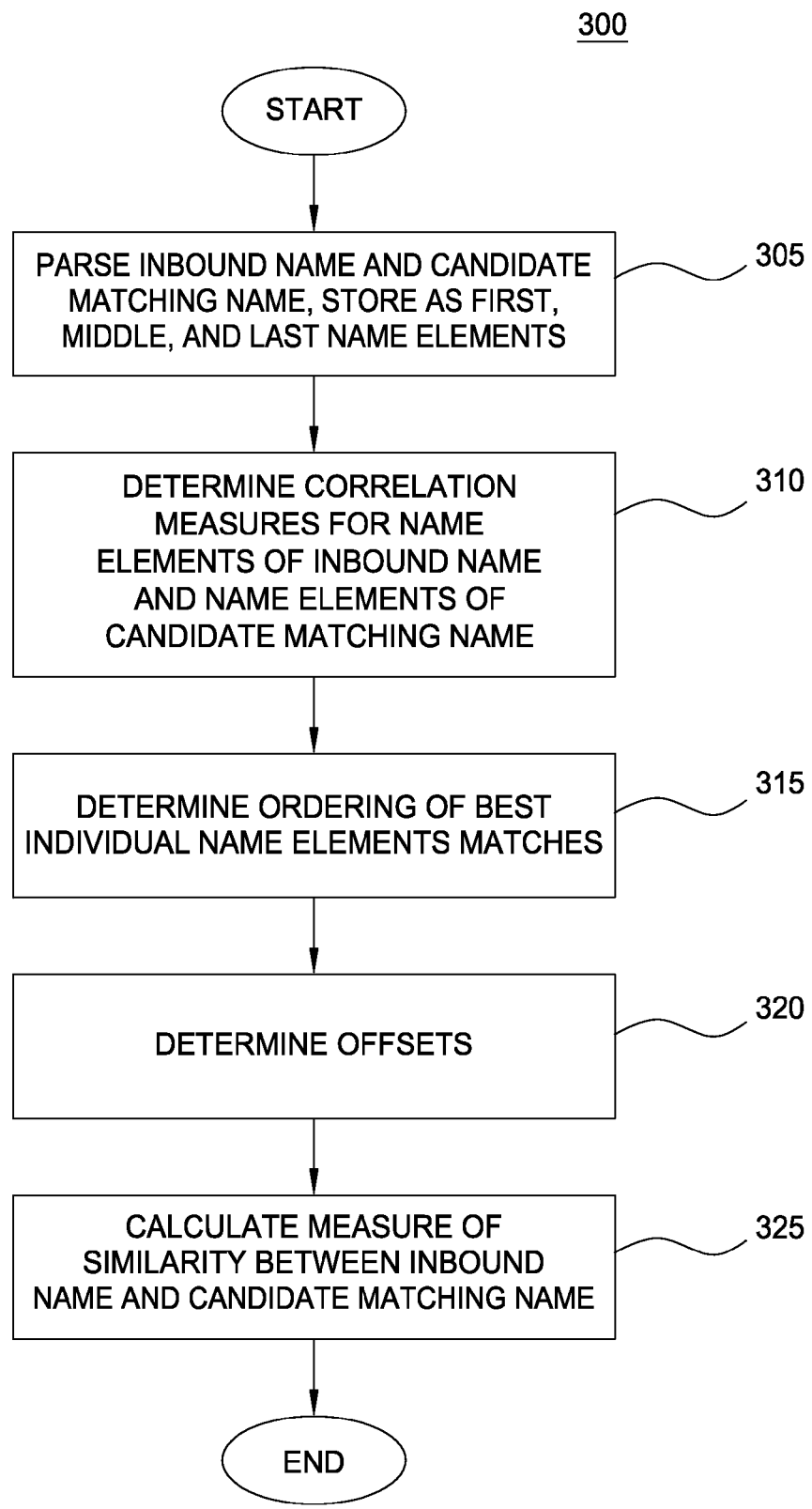
FIG. 3 illustrates a method for measuring the similarity between an inbound name and a candidate matching name, according to one embodiment of the invention.

FIG. 3 illustrates a method 300 for measuring the similarity between an inbound name and a candidate matching name, according to one embodiment of the invention. Method 300 is described in conjunction with FIGS. 4 and 5 to calculate a single similarity score between an example inbound name 109 and candidate matching name 142. In one embodiment, however, the method 300 may be performed multiple times using different permutations of inbound name 109 and/or candidate matching name 142. In such a case, the permutation having the highest score 250 may be returned. Additionally, inbound name 109 may be compared against multiple candidate matching names 142, and the one having the highest measure of similarity may be returned along with the score 250 for that candidate matching name.

As shown, the method 300 begins at step 305 where the name comparison engine 130 receives inbound name 109 and candidate matching name 142. In one embodiment, inbound name 109 and candidate matching name 142 are provided as multiple character strings representing the first, middle, and/or last name elements individually. Alternatively, inbound name 109 and candidate matching name 142 may be provided as character strings that include multiple name elements, that is, as a single string that includes a first, middle, and/or last name. In such a case, the inbound name 109 and candidate matching name 142 may be parsed to identify the individual name elements. The resulting name elements may be stored as separate strings representing first, middle, and/or last name elements. The score 250 may be calculated using multiple variations of how the name elements are parsed. For example, the name "Mary Jones Smith" may be parsed a first, middle, and last name or parsed as Mary Jones-Smith, a first name and hyphenated last name, or even as Mary Smith-Jones, reversing the order of words in the hyphenated last name. Each of these permutations may be scored for similarity using the method 300, and the permutation having the highest result may be returned as score 250.

Figures 4A, 4B:
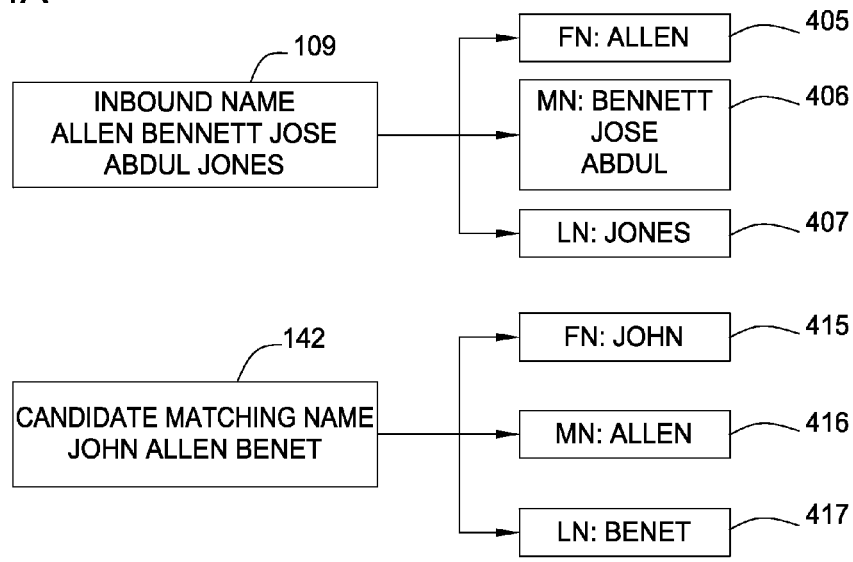
FIG. 4A is a block diagram showing an example inbound name and candidate matching name, according to one embodiment of the invention.
FIG. 4B illustrates a table of correlation measures for the name elements of the example inbound name and candidate matching name of FIG. 4A, according to one embodiment of the invention.

FIG. 4A is a block diagram showing an example inbound name 109 and candidate matching name 142 stored as individual name elements, according to one embodiment of the invention. As shown, the inbound name 109 of "Allen Bennett Jose Abdul Jones" is to be compared with candidate matching name 142 of "John Allen Benet." Illustratively, inbound name 109 is broken into three tokens: a first name token 405 of "Allen" a middle name token 406 of "Bennett Jose Abdul" and a last name token 407 of "Jones." Candidate matching name 142 is also broken into three tokens. Specifically, a first name token 415 of "John" a middle name token 416 of "Allen" and a last name token 417 of "Benet." In this example, inbound name 109 is parsed to generate three tokens used to store five name elements and candidate matching name 142 includes three tokens used to store three name elements.

Returning to the method 300, at step 310, name comparison engine 130 may determine a correlation measure between the name elements of inbound name 109 and the name elements of candidate matching name 142. The resulting measures may be used to determine which name elements (if any) in inbound name 209 match name elements in candidate matching name 142. In one embodiment, each name element in the inbound name 109 is matched only once. That is, only one match is made between an element of the inbound name 109 (e.g., a first name element) and an element of the candidate matching name 142. If more than one possible match is identified, the highest scoring match may be used. For example, in matching an inbound first name element of "Jon" with elements of a candidate matching name of "John Paul Jones," the name element "Jon" may have a high comparison score with both "John" and "Jones." In such a case, the name element of "Jon" would be matched with the higher score of the two; namely "John" of the candidate matching name "Jon Paul Jones."

In one embodiment, the known Jaro-Winkler algorithm for string correlation may be used to generate a correlation measure between name elements of the inbound name 109 and name elements of candidate matching name 142. As stated above, the Jaro-Winkler algorithm assigns a correlation measure for two strings that accounts for the following factors: length of both strings, percentage of common characters in each string, missing characters, mismatched characters, and transpositions between individual letters. Using the Jaro-Winkler algorithm, if the correlation measure for two name elements is "1," then the names being compared have exactly the same letters in the same sequence. In one embodiment, if such a match is identified, additional comparisons for that name may be skipped, as no match will be better than a score of "1." Additionally, after an exact match occurs, the name element may be omitted from being used in subsequent comparisons. For example, using the inbound name 109 and candidate matching name 142 illustrated in FIG. 4A, the following name comparisons may be performed:

Compare (Allen vs John); Record correlation measure
Compare (Allen vs Allen); Stop exact match
Compare (Allen vs. Benet); Skipped after exact match
Compare (Bennett vs. John); Record correlation measure
Compare (Bennett vs. Allen); Skipped, Allen already matched
Compare (Bennett vs. Benet); Record correlation measure
Compare (Jose vs. John); Record correlation measure
Compare (Jose vs. Allen); Skipped, Allen already matched
Compare (Jose vs. Benet); Record correlation measure
Compare (Abdul vs. John); Record correlation measure
Compare (Abdul vs. Allen); Skipped, Allen already matched
Compare (Abdul vs. Benet); Record correlation measure
Compare (Jones vs. John); Record correlation measure
Compare (Jones vs. Allen); Skipped, Allen already matched
Compare (Jones vs. Benet); Record correlation measure.

FIG. 4B illustrates a table 450 that stores the correlation measures generated from these comparisons. As shown, table 450 includes an inbound position column 455, a match position column 460 a similarity score column 465 and a keep/discard column 470. The similarity score column 465 stores the correlation measure for the name elements identified in a given row of table 450. Each row also records the position of the name element from the inbound name 109 and the position of the name element of the candidate matching name 142. The positions may be used to determine whether elements of the inbound name 109 or candidate matching name 142 have been transposed in order to match one another. The keep/discard column 470 indicates whether the correlation measure between a name element from inbound name 109 and a name element from candidate matching name 142 is high enough to be considered a "match." Although the threshold may be set to any level, experience has proven that a minimum score of 0.75 is a reasonable threshold for considering a comparison between name elements to be a match.

In this case, the first name element "Allen" of inbound name 109 is an exact match for the second name element "Allen" of candidate matching name 142. Additionally, although not exact matches, the Jaro-Winkler scores for "Bennett" and "Benet" and "Jones" an "John" are also considered matches, with scores of 0.905 and 0.783, respectively. Both of these scores are high enough to be considered a "match" using a match threshold of 0.75.

Returning to the method 300, at step 315, the name element matches are determined from the name comparisons performed at step 310, as well as an ordering for the matching name elements. As stated, in one embodiment, each name element in the inbound name 109 may be matched with at most one name element from the candidate match name 142. Generally, a match between a name element in inbound name 109 and in candidate matching name 142 with the highest comparison score above the match threshold.

At step 320, offsets are determined for inbound name 109 and candidate matching name 142. The offsets include data used to calculate an overall measure of similarity between inbound name 109 and candidate matching name 142. In one embodiment, the offsets may include the number of name elements in inbound name 109, the number of name elements in candidate matching name 142, the number of matching name elements identified at step 310, and the number of transpositions that occur ordering matching name elements.

FIG. 5A illustrates a table 515 of matching name elements and offset data 517 generated for inbound name 109 and candidate matching name 142, according to one embodiment of the invention. As shown, table 515 includes the names "Allen," Bennett" and "Jones" from the inbound name 109 matched to the names "Allen," "Benet" and "John" from the candidate matching name 142. Table 515 is sorted based on the order of matched name elements in the inbound name 109.

Illustratively, offsets 517 include words-in-common (3), an inbound name count (5) a candidate match name count (3) and number of transpositions (1). The words-in-common specifies the number of matching name elements identified for inbound name 109 and candidate matching name 142. Specifically, the following name elements match one another: "Allen" and "Allen," at positions 1 and 2, "Bennett" and Benet," at positions 2 and 3, and "Jones" and "John," at positions 5 and 1.

As shown, offsets 517 also include the number of transpositions that occur in the matched name elements of inbound name 109 and candidate matching name 142. Generally, a transposition reflects a reordering of a name element in one name (e.g., candidate matching name 142) to achieve a match with a name element present in the other name (e.g., inbound name 109). For example, table 515 is sorted based on the name positions 1, 2, and 5 of inbound name 109. Transpositions may be determined by evaluating the sequence of word positions in the matching position column 460. In this case position orders of 2, 3, and 1. Scanning down the rows of table 515, if the matching position in the next row is less than the matching position in the current row, a transposition has occurred. In this case, a transposition may be identified from the name element "Benet" (position 3) preceding the position of the name element "John" (position 1). The match above has one transposition because the sequence is rotated to move the name element "John" to the end of the candidate matching name 142 in order to match the name element "Jones" of inbound name 109.

If only one matching name element is identified between a given inbound name 109 and candidate matching name 142, then the position of that name element must be the same, otherwise a transposition is considered to have occurred. Additionally, "half" transpositions may occur. In one embodiment, a half transposition adds a value of 0.5 to the transposition count. A "half" transposition may be considered to have occurred when an initial in one name is matched to a full name element in another, or when one name element is shifted without being transposed with another name element. For example the name "Robert J. Jones" would have a half transposition when evaluated against "Robert Jeff Jones." As would the name "Robert Jones" when compared with "Joseph Robert Jones." In one embodiment, assessing "half" transposition provides a mechanism to reduce the scoring of matches based on initials, or on word position-shifts, without overly complicating the overall formula for assigning a similarity measure to names.

Returning to the method 300, at step 325, a measure of similarity between the inbound name 109 and candidate matching name 142 may be determined. In one embodiment, the offsets calculated at step 315 are evaluated using a similarity equation to determine a measure of similarity between the inbound name 109 and candidate matching name 142. FIG. 5B illustrates an equation 500 for measuring the similarity between two names, according to one embodiment of the invention. As shown, the equation 500 includes the sum of three components: a first component 502, a second component 504, and a third component 506, having the values as specified in FIG. 5B. Additionally, elements of equation 500 are shown in equation 510 using algebraic symbols. Although the weighting coefficients may be set to any value, experience has proven that an even distribution of $x=\frac{1}{3}$, $y=\frac{1}{3}$, and $z=\frac{1}{3}$ is reasonable.

FIG. 5C illustrates the similarity equation 510 from FIG. 5B used to calculate a measure of similarity 525 between inbound name 109 and candidate matching name 142, according to one embodiment of the invention. Specifically, equation 519 shows the values of offsets 517 evaluated using equation 510, and a calculated initial measure of similarity 523, in this case a value of 0.7555. The initial measure of similarity 523 may be weighted to reflect the correlation measures for each matching name element. Using the present example, the matches of "Bennett" and "Benet" and "Jones" and "John" are not exact. In one embodiment, the Jaro-Winkler correlation measure for each matching name element may be used to weight initial measure of similarity 523. In this case, the initial measure of similarity (0.755) is weighted to produce a final measures of similarly 521 between inbound name 109 and candidate matching name 142, in this case a value of 0.535.

As stated, the method 300 may be performed for multiple permutations of inbound name 109 and candidate matching name 142. For example, permutations may be generated using a dictionary of standardized names 144 for the individual name elements of inbound name 109 and candidate matching name 142. In such a case, the similarity score may be reduced (i.e., penalized) to reflect the use of standardized names. Although adjustments for the use of standardized names may be varied to suit the needs of a particular case, experience has proven that a standardized name reduction penalty of 0.05 is reasonable. Doing so allows common nicknames, or common name variants (e.g., "John," "Johnny," "Jonathon," and "Jon") to still be return a high measure of similarity. For example, consider an example inbound name 109 that includes the first name of "Zeke" compared with a possible matching name element of "Isaac." Obviously, the Jaro-Winkler correlation measure will be very low for theses two name elements. Thus, using standardized versions for these name elements may lead to a higher measure of similarly than the actual strings, despite the standardization penalty.

Further, the inbound name 109 and candidate matching name 142 may be parsed in different ways to produce different combinations of first, middle, and last name. In such a case, only a subset of the name elements from inbound name 109 and/or candidate matching name 142 is passed to the comparison engine 130 and compared using method 300. Doing so may account for errors in how a name is parsed, or even how a name is submitted. For example, the name "Mary Smith Johnson" might be inadvertently input as "Mary Johnson Smith" or the name "Joseph, Smith" may be input without the comma, leading to a reversal of first and last name. Thus, in some cases, considering various combinations of different name elements may increase the score returned by name comparison engine 130. In one embodiment, the method 300 may be used to create individual scores for a first and middle name and then a separate score is generated for a surname, or vice-versa.

The following provides an example name comparison score generated for different first and middle name combinations and then a separate score generated for a surname comparison. A complete set of comparison scores generated for the first and middle names would include the following:
Compare: First Name and Middle Name vs First Name and Middle Name
Compare: Middle Name and First Name vs First Name and Middle Name
Compare: First Name vs First Name and Middle Name
Compare: First Name and Middle Name vs First Name
Compare: First Name vs Middle Name and First Name
Compare: Middle Name and First Name vs First Name
Compare: First Name vs First Name Taking the same names used in the Example of FIGS. 3-5 of "Allen Bennett Jose Abdul Jones" compared with the name of "John Allen Benet," the names may be parsed into the tokens illustrated in FIG. 4A as follows:

| First Name: Allen | First Name: John |
| Middle Name: Bennett Jose Abdul | Middle Name: Allen |
| Last Name: Jones | Last Name Benet |

Using the above comparison permutations, the first pass compares the First Name and Middle Name of the inbound name 109 with the First Name and Middle Name of the candidate matching name 142. Thus, in the current example, "Allen Bennett Jose Abdul" is compared with "John Allen." Using the method 300, this results in the following individual name matches and measure of similarity calculated using equation 510:
Allen vs Allen=1
Bennett matches nothing
Jose matches nothing
Abdul matches nothing $$\text{Final score} = (1/3)(1/4) + (1/3)(1/2) + 1/3(0) = 0.08 + 0.17 + 0.0 = 0.25$$

Next, Middle Name and First Name vs First Name and Middle Name are compared. That is, "Allen Bennett Jose Abdul" is compared with "Allen John." Doing so results in the following assigned measure of similarity calculated using equation 510:
Allen vs Allen=1
Bennett matches nothing
Jose matches nothing
Abdul matches nothing $$\text{Final score} = (1/3)(1/4) + (1/3)(1/2) + 1/3(1) = 0.08 + 0.17 + 0.33 = 0.58$$

Using each of the above permutation combinations, the best score is achieved using the comparison of First Name vs Middle Name and First Name. That is, a combination of "Allen" vs "Allen John" which leads to the following assigned measure of similarity calculated using equation 510:

$$\text{Final Score} = (1/3)(1/4) + (1/3)(1/2) + 1/3(1) = 0.33 + 0.17 + 0.33 = 0.80$$

Once first and middle name permutations are scored, the surname permutation may be scored. Using the best match for first and middle names ("Allen" vs "Allen John") leads to "Bennett Jose Abdul Jones" vs "Benet" being used as surnames input to method 300. Comparing these names using the method 300 leads to the following surname score using equation 510:

$$\text{Final score} = (1/3)(1/4) + (1/3)(1/1) + (1/3)(1) = 0.08 + 0.33 + 0.33 = 0.74$$

Like name comparisons described above using the complete inbound name 109 and candidate matching name 142, first name and last name scoring performed for subsets of name elements may be performed for the original input name elements as well as for standardized versions of those name elements.

While the foregoing is directed to embodiments of the present invention, other and further embodiments of the invention may be devised without departing from the basic scope thereof, and the scope thereof is determined by the claims that follow.

What is claimed is:

1. A method of determining a measure of similarity between an inbound name and a candidate matching name, comprising:
    identifying one or more matches between name elements of the inbound name and name elements of the candidate matching name, wherein each match is identified based on a correlation measure between the matched name element of the inbound name and the matched name element of the candidate matching name;
    for the identified matches, determining a number of transpositions in an order of name elements of the inbound name elements relative to the name elements of the candidate matching name; and
    calculating a measure of similarity based on the number of matching name elements, an inbound name word count, a candidate matching name word count, and the number of transpositions.

2. The method of claim 1, wherein the correlation measure between the matched name element of the inbound name and the matched name element of the candidate matching name is determined using the Jaro-Winkler measure of string correlation.

3. The method of claim 1, further comprising standardizing the name elements of the inbound name or the candidate matching name using a name dictionary.

4. The method of claim 3, wherein the measure of similarity between the inbound and name and the candidate matching name is reduced to reflect a standardization penalty.

5. The method of claim 1, wherein the measure of similarity is calculated according to the equation of:

$$(1/3)*(\text{Number of matching name elements/inbound name word count})+(1/3)*(\text{Number of matching name elements/candidate matching name word count})+(1/3)*((\text{Number of matching name elements}-\text{Number of transpositions})/(\text{Number of matching name elements})).$$

6. The method of claim 1, wherein the name elements include a first name element, a middle name element, and a surname name element.

7. The method of claim 1, wherein the measure of similarity between the inbound name and the candidate matching name is calculated based on a subset of the name elements in the inbound name or in the candidate matching name.

8. A computer readable storage medium containing a program which, when executed, performs an operation for determining a measure of similarity between an inbound name and a candidate matching name, comprising:
    identifying one or more matches between name elements of the inbound name and name elements of the candidate matching name, wherein each match is identified based on a correlation measure between the matched name element of the inbound name and the matched name element of the candidate matching name;
    for the identified matches, determining a number of transpositions in an order of name elements of the inbound name elements relative to the name elements of the candidate matching name; and
    calculating a measure of similarity based on the number of matching name elements, an inbound name word count, a candidate matching name word count, and the number of transpositions.

9. The computer readable storage medium of claim 8, wherein the correlation measure between the matched name element of the inbound name and the matched name element of the candidate matching name is determined using the Jaro-Winkler measure of string correlation.

10. The computer readable storage medium of claim 8, wherein the operations further comprise, standardizing the name elements of the inbound name or the candidate matching name using a name dictionary.

11. The computer readable storage medium of claim 10, wherein the measure of similarity between the inbound and name and the candidate matching name is reduced to reflect a standardization penalty.

12. The computer readable storage medium of claim 8, wherein the measure of similarity is calculated according to the equation of:

$$(1/3)*(\text{Number of matching name elements/inbound name word count})+(1/3)*(\text{Number of matching name elements/candidate matching name word count})+(1/3)*((\text{Number of matching name elements}-\text{Number of transpositions})/(\text{Number of matching name elements})).$$

13. The computer readable storage medium of claim 8, wherein the name elements include a first name element, a middle name element, and a surname name element.

14. The computer readable storage medium of claim 8, wherein the measure of similarity between the inbound name and the candidate matching name is calculated based on a subset of the name elements in the inbound name or in the candidate matching name.

15. A system, comprising:
    a processor; and
    a memory containing a program configured to determine a measure of similarity between an inbound name and a candidate matching name by:
        identifying one or more matches between name elements of the inbound name and name elements of the candidate matching name, wherein each match is identified based on a correlation measure between the matched name element of the inbound name and the matched name element of the candidate matching name;
        for the identified matches, determining a number of transpositions in an order of name elements of the inbound name elements relative to the name elements of the candidate matching name; and
        calculating a measure of similarity based on the number of matching name elements, an inbound name word count, a candidate matching name word count, and the number of transpositions.

16. The system of claim 15, wherein the correlation measure between the matched name element of the inbound name and the matched name element of the candidate matching name is determined using the Jaro-Winkler measure of string correlation.

17. The system of claim 15, wherein the name elements of the inbound name or the candidate matching name are standardized using a name dictionary.

18. The system of claim 17, wherein the measure of similarity between the inbound and name and the candidate matching name is reduced to reflect a standardization penalty.

19. The system of claim 15, wherein the measure of similarity is calculated according to the equation of:

$$(1/3)*(\text{Number of matching name elements/inbound name word count})+(1/3)*(\text{Number of matching name elements/candidate matching name word count})+(1/3)*((\text{Number of matching name elements}-\text{Number of transpositions})/(\text{Number of matching name elements})).$$

20. The system of claim 15, wherein the name elements include a first name element, a middle name element, and a surname name element.

21. The system of claim 15, wherein the measure of similarity between the inbound name and the candidate matching name is calculated based on a subset of the name elements in the inbound name or in the candidate matching name.

* * * * *